United States Patent Office 2,902,466
Patented Sept. 1, 1959

2,902,466

STABILIZATION OF RUBBER

Robert H. Rosenwald, Western Springs, and Joseph A. Chenicek, Bensenville, Ill., assignors, by mesne assignments, to Universal Oil Products Company, Des Plaines, Ill., a corporation of Delaware No Drawing. Application December 30, 1953
Serial No. 401,429

13 Claims. (Cl. 260—45.9)

This application is a continuation-in-part of our copending application Serial Number 375,278, filed August 19, 1953, now abandoned, and relates to the stabilization of rubber and more particularly to a novel method of preventing and/or retarding cracking of rubber.

Both natural and synthetic rubbers have a tendency to undergo cracking in use when subjected to air, ozone, heat and/or light. This tendency to crack is considerably accelerated in the presence of ozone. The present invention provides a novel method of retarding and/or preventing this deterioration.

In one embodiment the present invention relates to a method of stabilizing rubber against cracking which comprises incorporating therein a stabilizing amount of an N,N'-dialiphatic-p-phenylene diamine in which each of the aliphatic groups contains at least 13 carbon atoms.

In a specific embodiment the present invention relates to a method of stabilizing rubber against cracking which comprises incorporating therein from about 0.001% to about 5% by weight of N,N'-di-2-tridecyl-p-phenylene diamine.

In another embodiment the present invention relates to a method of stabilizing rubber against cracking which comprises incorporating therein from about 0.001% to about 5% by weight of N,N'-di-2-octadecyl-p-phenylene diamine.

In still another embodiment the present invention relates to rubber stabilized against cracking by the inclusion therein of a stabilizing amount of an N,N'-dialiphatic-p-phenylene diamine in which each of the aliphatic groups contains at least 13 carbon atoms.

In accordance with the present invention rubber and rubbery products are stabilized by incorporating therein a stabilizing amount of a di-substituted-p-phenylene diamine of a particular composition. The use of the particular di-substituted-p-phenylene diamines of the present invention offers numerous advantages over other additives. They appear to be non-toxic and therefore may be used in rubber which contacts food products and also may be used by workers without harmful toxic effects. Furthermore, the novel additives of the present invention are water insoluble and therefore will not be lost during washing of the rubber or contact thereof with water. Still further, the additives of the present invention are non-volatile and therefore will be satisfactorily retained in the rubber and will not be lost during long periods of high temperature use as otherwise encountered with volatile additives.

Each of the aliphatic groups in the N,N'-di-aliphatic-p-phenylene diamine must contain at least 13 carbons and may contain from 13 to about 30 and preferably from 13 to 20 carbon atoms. Preferred additives comprise N,N'-di-alkyl-p-phenylene diamines including N,N'-di-tridecyl-p-phenylene diamine, N,N'-di-tetradecyl-p-phenylene diamine, N,N'-di-pentadecyl-p-phenylene diamine, N,N'-di-hexadecyl-p-phenylene diamine, N,N'-di-heptadecyl-p-phenylene diamine, N,N'-di-octadecyl-p-phenylene diamine, N,N'-di-nonadecyl-p-phenylene diamine and N,N'-di-eicosyl-p-phenylene diamine. Particularly preferred compounds comprise those in which the substituent is attached to the nitrogen on a nonterminal carbon atom.

The above compounds herein specifically set forth contain from 13 to 20 carbon atoms in each of the substituents. In general these are preferred, although it is understood that substituents containing more than 20 and up to 30 or more carbon atoms each may be employed.

Compounds containing from 21 to 30 carbon atoms in each substituent include N,N'-di-heneicosyl-p-phenylene diamine, N,N'-di-docosyl-p-phenylene diamine, N,N'-di-tricosyl-p-phenylene diamine, N,N'-di-tetracosyl-p-phenylene diamine, N,N'-di-pentacosyl-p-phenylene diamine, N,N'-di-hexacosyl-p-phenylene diamine, N,N'-di-heptacosyl-p-phenylene diamine, N,N'-di-octacosyl-p-phenylene diamine, N,N'-di-nonacosyl-p-phenylene diamine and N,N'-di-decacosyl-p-phenylene diamine.

In another embodiment the substituents may comprise alkenyl groups as in compounds including N,N'-di-tridecenyl-p-phenylene diamine, N,N'-di-tetradecenyl-p-phenylene diamine, N,N'-di-pentadecenyl-p-phenylene diamine, N,N'-di-hexadecenyl-p-phenylene diamine, N,N'-di-heptadecenyl-p-phenylene diamine, N,N'-di-octadecenyl-p-phenylene diamine, N,N'-di-nonadecenyl-p-phenylene diamine and N,N'-di-eicosenyl-p-phenylene diamine, etc. In still another embodiment, each of the aliphatic substituents may be different and may comprise aliphatic groups of different chain length and/or different chain structure, as well as saturated and unsaturated substituents. Illustrative compounds include N-tridecyl-N'-tetradecyl-p-phenylene diamine, N-tridecyl-N'-pentadecyl-p-phenylene diamine, N-tridecyl-N'-hexadecyl-p-phenylene diamine, etc., N-tetradecyl-N'-pentadecyl-p-phenylene diamine, N-tetradecyl-N'-hexadecyl-p-phenylene diamine, N-tetradecyl-N'-heptadecyl-p-phenylene diamine, etc., N-hexadecyl-N'-heptadecyl-p-phenylene diamine, N-hexadecyl-N'-octadecyl-p-phenylene diamine, N-hexadecyl-N'-nonadecyl-p-phenylene diamine, etc., N-octadecyl-N'-nonadecyl-p-phenylene diamine, N-octadecyl-N'-eicosyl-p-phenylene diamine, etc., N-tridecyl-N'-tridecenyl-p-phenylene diamine, N-tridecyl-N'-pentadecenyl-p-phenylene diamine, N-tridecyl-N'-hexadecenyl-p-phenylene diamine, etc., N-tetradecyl-N'-tetradecenyl-p-phenylene diamine, N-tetradecyl-N'-pentadecenyl-p-phenylene diamine, N-tetradecyl-N'-hexadecenyl-p-phenylene diamine, etc., N-2-tridecyl-N'-4-tridecyl-p-phenylene diamine, N-2-tridecyl-N'-4-(2-methyl-heptadecyl)-p-phenylene diamine, etc. In some cases the additive may contain a cyclic radical including phenyl, cyclohexyl, cyclohexenyl, etc., but must contain at least one aliphatic substituent having at least 13 carbon atoms. In still other cases the additive may contain one aliphatic group containing less than 13 carbon atoms but the other aliphatic group must contain at least 13 carbon atoms.

The aliphatic substituents may be straight or branched chain. The branched chain groups may contain one or more branching in the chain, for example, in such compound as N,N'-di-4-(2-methyl-dodecyl)-p-phenylene diamine prepared by the reductive alkylation of p-phenylene diamine or p-nitroaniline with isobutyl octyl ketone, etc. It is understood that the compounds for use in accordance with the present invention may be prepared in any suitable manner. A preferred method is by the reductive alkylation of p-phenylene diamine or p-nitroanaline with a suiatble ketone or aldehyde. A particularly preferred catalyst for effecting the reaction comprises a mixture of the oxides of chromium, copper and barium, although other suitable catalysts may be employed. Other catalysts include those containing cobalt, nickel, platinum, palladium, molybdenum, etc. In general, the reaction is effected at an elevated temperature of from about 100 to about 250° C. and a hydrogen pressure of from about 3 to about 200 atmospheres.

When the additive compound includes alkenyl groups, it may be prepared by the reaction of p-phenylene diamine or p-nitroaniline with vinyl decyl ketone, vinyl undecyl ketone, vinyl dodecyl ketone, vinyl tridecyl ketone, vinyl pentadecyl ketone, etc., allyl monyl ketone, allyl decyl ketone, allyl undecyl ketone, allyl dodecyl ketone, allyl tridecyl ketone, etc. This reaction is effected in substantially the same manner as hereinbefore set forth and, depending upon the extent of hydrogenation, may comprise N,N'-di-alkenyl-p-phenylene diamine or a mixture of N,N'-di-alkyl-p-phenylene diamine and N,N'-di-alkenyl-p-phenylene diamine.

The phenylene diamine may contain, in addition to the nitrogens, one or more substituents attached to the phenylene nucleus. The substituent preferably comprises a hydrocarbon group, including alkyl, alkenyl, aryl, alkaryl, aralkyl, cycloalkyl, etc., although it may contain oxygen, nitrogen and/or sulfur. It is understood that the various additive compounds which may be prepared and used in accordance with the present invention are not necessarily equivalent.

The additives of the present invention may be incorporated in rubber or rubbery products in any suitable manner and at any suitable stage of preparation. In general the additive will be utilized in an amount of from about 0.001% to about 5% by weight of the rubber, although in some cases higher or lower concentrations may be employed. It is understood that the additives of the present invention may be utilized along with other additives incorporated in rubber for specific purposes, including accelerators, softeners, etc.

The additives of the present invention may be utilized in any rubber composition subject to cracking or other deterioration, including those used for automobile tires and tubes, hose, belting, sheet and thread rubber, rubberized fabrics, molded goods, boots and shoes, etc., whether vulcanized in a mold, in open steam, in hot air, or in the cold by the so-called acid process. In another embodiment the present invention may be utilized for the stabilization of plastics, adhesives, elastomers, etc., which tend to crack or otherwise deteriorate in storage or in use. When the additive is added to a liquid, such as rubber pigment or an oil, it may be dissolved therein in the desired proportions. When it is to be added to a solid substance, it may be incorporated therein by milling, mastication, etc. The additive may be utilized as such or as a solution or dispersion, or as a powder, paste, etc.

It is understood that the term rubber as used herein is intended to include both natural and synthetic rubber, including those produced by the reaction of butadiene and styrene, butadiene and acrylonitrile, etc., as well as reclaims and latices of rubbery materials, whether or not admixed with fillers, pigments, accelerating agents, etc.

The following examples are introduced to illustrate further the novelty and utility of the present invention but not with the intention of unduly limiting the same.

*Example I*

N,N'-di-2-tridecyl-p-phenylene diamine was prepared by the reductive alkylation of p-phenylene diamine and methyl undecyl ketone. The product had a melting point of 63.5–65° C. and a boiling point of 235–245° C. at a pressure of 1 mm. of mercury.

2.5% by weight of N,N'-di-2-tridecyl-p-phenylene diamine prepared in the above manner is incorporated in a commercial rubbery butadiene-styrene copolymer composition containing the usual ingredients including carbon black, zinc oxide, sulfur, etc. The ingredients are combined on a rubber mill in the conventional manner and then the mix is cured.

Upon exposure to ozone in a concentration of 85 parts of ozone per 100 million parts of air, the rubber containing N,N'-di-2-tridecyl-p-phenylene diamine undergoes less cracking than is encountered in a similar rubber not containing the additive.

*Example II*

N,N'-di-2-heptadecyl-p-phenylene diamine is prepared by the reductive alkylation of p-phenylene diamine with methyl pentadecyl ketone. The resulting additive may be incorporated in a concentration of 2% by weight in a synthetic rubber mixture similar to that described in Example I, and serves to retard cracking of the rubber produced therefrom.

*Example III*

N,N'-di-2-octadecyl-p-phenylene diamine is prepared by the reductive alkylation of p-phenylene diamine with methyl hexadecyl ketone. The resulting additive may be incorporated in a concentration of 2% by weight in rubber and will serve to retard cracking of the rubber.

*Example IV*

N,N'-di-4-(2-methyl-heptadecyl)-p-phenylene diamine is prepared by the reductive alkylation of p-phenylene diamine with isobutyl tridecyl ketone. The resulting additive may be incorporated in a concentration of 3% by weight in elastomers to retard cracking thereof.

We claim as our invention:

1. A rubber selected from the group consisting of natural rubber, rubbery butadiene-styrene copolymer and rubbery butadiene-acrylonitrile copolymer containing from about 0.001% to about 5% by weight of an N,N'-di-aliphatic-p-phenylene diamine in which each of the aliphatic groups is a hydrocarbon radical containing from about 13 to about 30 carbon atoms.

2. A rubber selected from the group consisting of natural rubber, rubbery butadiene-styrene copolymer and rubbery butadiene-acrylonitrile copolymer containing from about 0.001% to about 5% by weight of an N,N'-di-alkenyl-p-phenylene diamine in which each of the alkenyl groups contains from about 13 to about 20 carbon atoms.

3. A rubber selected from the group consisting of natural rubber, rubbery butadiene-styrene copolymer and rubbery butadiene-acrylonitrile copolymer containing from about 0.001% to about 5% by weight of an N,N'-di-alkyl-p-phenylene diamine in which each of the alkyl groups contains from about 13 to about 20 carbon atoms.

4. A rubber selected from the group consisting of natural rubber, rubbery butadiene-styrene copolymer and rubbery butadiene-acrylonitrile copolymer containing from about 0.001% to about 5% by weight of N,N'-di-tridecyl-p-phenylene diamine.

5. A rubber selected from the group consisting of natural rubber, rubbery butadiene-styrene copolymer and rubbery butadiene-acrylonitrile copolymer containing from about 0.001% to about 5% by weight of N,N'-di-2-tridecyl-p-phenylene diamine.

6. A rubber selected from the group consisting of natural rubber, rubbery butadiene-styrene copolymer and rubbery butadiene-acrylonitrile copolymer containing from about 0.001% to about 5% by weight of N,N'-di-tetradecyl-p-phenylene diamine.

7. A rubber selected from the group consisting of natural rubber, rubbery butadiene-styrene copolymer and rubbery butadiene-acrylonitrile copolymer containing from about 0.001% to about 5% by weight of N,N'-di-pentadecyl-p-phenylene diamine.

8. A rubber selected from the group consisting of natural rubber, rubbery butadiene-styrene copolymer and rubbery butadiene-acrylonitrile copolymer containing from about 0.001% to about 5% by weight of N,N'-di-heptadecyl-p-phenylene diamine.

9. A rubber selected from the group consisting of natural rubber, rubbery butadiene-styrene copolymer and rubbery butadiene-acrylonitrile copolymer containing from about 0.001% to about 5% by weight of N,N'-di-octadecyl-p-phenylene diamine.

10. A rubber selected from the group consisting of natural rubber, rubbery butadiene-styrene copolymer and rubbery butadiene-acrylonitrile copolymer containing from about 0.001% to about 5% by weight of N,N'-di-2-octadecyl-p-phenylene diamine.

11. A composition as defined in claim 1 further characterized in that said rubber comprises a butadiene-styrene copolymer.

12. A composition as defined in claim 3 further characterized in that said rubber comprises a butadiene-styrene copolymer.

13. A composition as defined in claim 5 further characterized in that said rubber comprises a butadiene-styrene copolymer.

References Cited in the file of this patent

UNITED STATES PATENTS

| | | |
|---|---|---|
| 2,067,686 | Semon | Jan. 12, 1937 |
| 2,686,719 | Chenicek | Aug. 17, 1954 |
| 2,692,288 | Bell | Oct. 19, 1954 |
| 2,734,808 | Biswell | Feb. 14, 1956 |
| 2,843,643 | Gleim | July 15, 1958 |

OTHER REFERENCES

"Rubber World," Shaw et al., August 1954, volume 130, pp. 636–642. (Copy in Scientific Library.)